United States Patent [19]

Gonsewski et al.

[11] 3,863,025

[45] Jan. 28, 1975

[54] DATA TRANSMISSION METHOD

[75] Inventors: Leonard E. Gonsewski, Mount Prospect; Paul U. Lind, Lombard, both of Ill.

[73] Assignee: GTE Automatic Electric Laboratories Incorporated, Northlake, Ill.

[22] Filed: Apr. 25, 1973

[21] Appl. No.: 354,280

[52] U.S. Cl. ............. 178/69.5 R, 178/68, 325/38 A

[51] Int. Cl. .............................................. H04l 3/00

[58] Field of Search ............ 178/66 R, 66 A, 67, 68, 178/69.5 R; 325/30.38 R, 38 A, 41, 163, 164, 141

[56] References Cited

UNITED STATES PATENTS

| | | | |
|---|---|---|---|
| 3,223,925 | 12/1965 | Florac, Jr. et al. | 325/163 |
| 3,349,328 | 10/1967 | Hunkins et al. | 325/38 R |
| 3,394,313 | 7/1968 | Ellis et al. | 178/67 X |
| 3,419,804 | 12/1968 | Gorog et al. | 178/68 X |
| 3,467,777 | 9/1969 | Rumble | 178/68 X |
| 3,665,474 | 5/1972 | Thayer et al. | 178/67 X |

*Primary Examiner*—Benedict V. Safourek
*Attorney, Agent, or Firm*—Robert J. Black

[57] ABSTRACT

A method for transmission of binary data. The method involves a data format which is self clocking and has no direct current component. Transmitting and receiving circuitry for handling the improved format are included.

10 Claims, 5 Drawing Figures

GATE CIRCUIT SYMBOLS

DATA TRANSMISSION METHOD

BACKGROUND OF THE INVENTION

1. Field of the Invention

This invention relates to data transmission and more particularly to the transmission of binary information over a transmission facility. The present invention is particularly useful when transformer coupling is required at the transmitting or receiving ends of a cable or similar transmission facility, and/or whenever a requirement exists to recover clock pulses from received data.

2. Description of the Prior Art

Included in the many techniques of data transmission is a self clocking data format currently in use known as "polar return to zero." In this particular technique three states or voltage levels are used by the inclusion of a zero or neutral state. This technique permits clock pulses to be extracted from the data. In this technique a positive signal represents a "mark" and a negative signal represents a "space." Each mark or space is followed by an off period at the zero state or level. Thus by means of a logical OR function a clock pulse may be derived whenever a mark or space is sent. In this particular technique if the data is stopped so do the clock pulses.

Reference is made to the accompaning drawings wherein FIG. 1 shows a pulse chart indicating a data stream (A) that consists of a space followed by a mark, two spaces and another mark. A regular recurring clock pulse is shown (B), and finally the data output signal (C) showing the marks as potential levels above neutral, spaces as levels below neutral and both marks and spaces coincident with the clock pulses (B).

The disadvantage of the "polar return to zero" method is that a d.c. component may appear on a string of data bits. For instance if all marks were sent, the d.c. component would be positive. Therefore, particularly if transformer coupling is used, the data will become distorted because the d.c. component is lost. This type of distortion is known as base band wander.

A technique of eliminating the d.c. signal component and base band wander is to use the zero state (as described above) as a space. Marks are then sent as either positive or negative pulses. The transmission of alternate positive and negative marks is employed in order to cancel the d.c. signal component. However in this technique, clock pulses cannot be derived from this type of data.

As may be noted by reference to FIG. 2 of the accompanying drawings wherein the same data input as shown in FIG. 1 is employed and similar clock pulses are likewise employed. The resulting data output signal (C) includes several successive spaces which are transmitted as a continuous zero signal. Obviously no clocking would be available from this signal. This method is known as bipolar signaling and is used in carrier signaling systems manufactured by Western Electric Company and designated T1. With the use of such a technique, clock signals are derived by a somewhat complicated means including synchronizing a free running oscillator to the bit stream.

The object of the present invention is to retain the self clocking feature found in polar return to zero signaling, while eliminating the d.c. signal component and the resultant base band wander.

SUMMARY OF THE INVENTION

In the transmission technique presented herein "mark" signals consist of a positive pulse followed immediately thereafter by a negative pulse. A "space" consists of a negative pulse followed immediately by a positive pulse. Each data bit is followed by an off period at a zero state. In the present system a two phase clock is used to generate the data signal and both phases of the clock may be recovered from the data stream. In this manner self clocking is permissible eliminating the requirement for complex clocking schemes of prior art transmission systems, while at the same time the regular use of both positive and negative pulses eliminates the d.c. signal component and the resultant base band wander characteristics found in prior art transmission techniques.

DESCRIPTION OF THE PREFERRED EMBODIMENT

Figure 4:
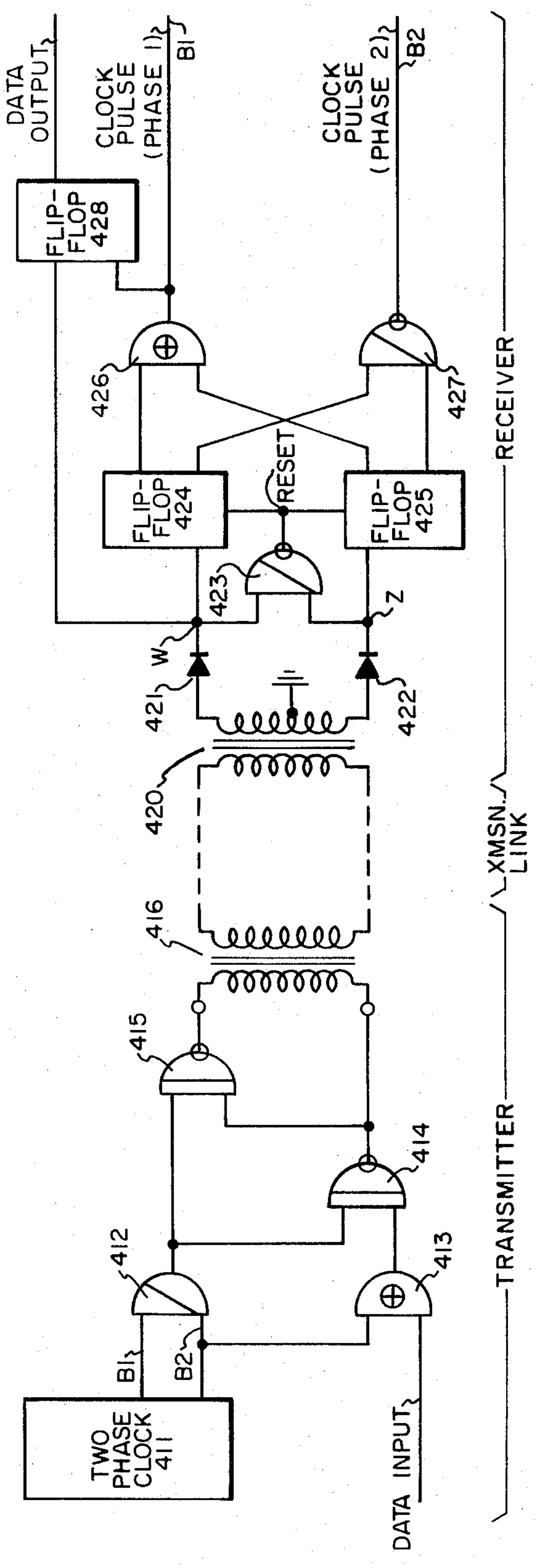
FIG. 4 is a logic diagram of a transmitter, receiver and connecting transmission link, with both transmitter and receiver employed in the transmission and reception of data in accordance with the present invention.
Figure 5:
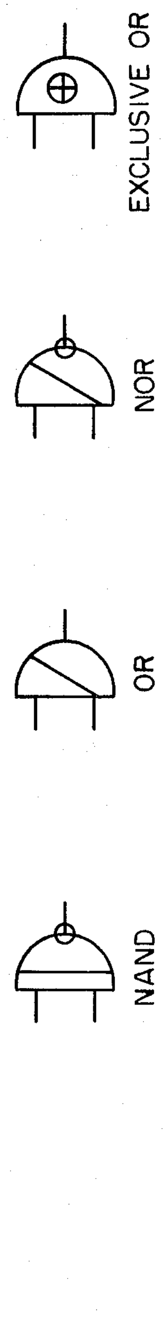
FIG. 5 describes the symbols used in a logic diagram of FIG. 4.

Referring now to FIG. 4 a transmitter for generating the type of signal proposed in the present invention is shown. Included is a two phase clock 411 which may assume any conventional form the details of which are not a portion of the present invention.

Figure 1:
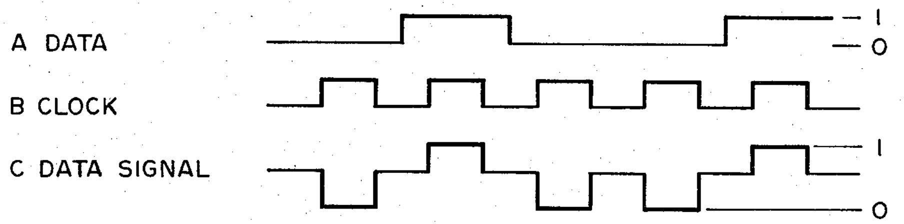
FIG. 1 (PRIOR ART)
FIG. 1 is a diagram of the pulses found in the polar return to zero data transmission technique found in the prior art. Data consisting of a "space" followed by a "mark" followed by two "spaces" and another "mark" is shown, the associated clock pulses and the resultant data output signal.
Figure 2:
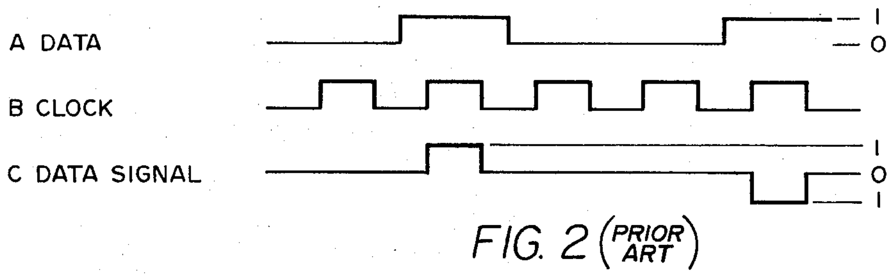
FIG. 2 (PRIOR ART)
FIG. 2 shows pulse diagrams of bipolar signaling including similar data and clock pulse diagrams to that shown in FIG. 1 and the resulting data signal found in this form of prior art transmission technique.
Figure 3:
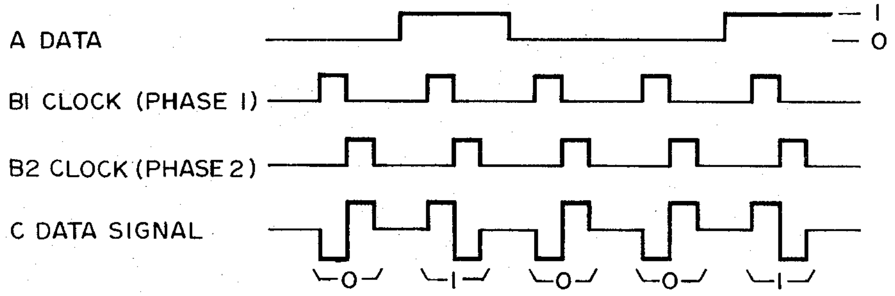
FIG. 3 shows pulse diagrams of data similar to that shown in FIGS. 1 and 2, the output pulses of a two phase clock and the resultant data output signal derived from the above data and a two phase clock in accordance with the present invention.

The two clock output phases are designated B1 and B2 and their relationship to each other is shown in the pulse diagrams of FIG. 3. Both phases are applied to the inputs of OR gate 412 which gives an output whenever the B1 or B2 clock output signal is present.

One input of EXCLUSIVE-OR gate 413 is connected to the input data and the other input of this gate is connected to B2. When B2 is zero during the first clock phase EXCLUSIVE-OR gate 413 passes the input signal giving an output of zero for a data input of "space" and "one" for a mark. However, when B2 is a one during the second clock phase EXCLUSIVE-OR gate 413 inverts the data input signal producing a one output for input data of "space" and a zero for input data of "mark."

Assuming the transmitter input data is a space, the following occurs during the first clock phase when B1 is a one and B2 is zero. The one output from gate 412 and zero output from gate 413 are coupled to the inputs of NAND gate 414 whose output becomes a one. This output is applied to one of the inputs of NAND gate 415 in combination with the output of gate 412. Since the output of gate 412 was a one the output of gate 414 is a one the output of NAND gate 415 becomes a zero which is applied to the top of the primary winding of transformer 416, who's secondary is connected to the transmission link. At the same time the output of gate 414 (a one) is applied to the lower end of the primary winding of transformer 416, the result being the transmission of a negative pulse over the transmission link.

During the next phase of the clock circuit 411 a B2 pulse is present. Again the output of gate 412 is a one. For the space input being considered the output of gate 413 changes to a one resulting in a zero output from gate 414. The one output from gate 412 is also extended to NAND gate 415 whose other input is supplied with a zero from gate 414 resulting in a one output from gate 415 applied to the upper terminal of the primary winding of transformer 416. The zero from gate 414 is applied to the lower terminal of the primary winding of transformer 416. The resultant output is transferred to the transmission link as a positive pulse. From the above it is obvious that for each incoming space data signal a negative pulse followed immediately thereafter by a positive pulse will be transmitted from the transmitter, during the presence of the two clock pulses from clock 411.

Assuming now that a mark signal is present at the data input of gate 413 represented by a one during the B1 clock pulse, gate 412 will generate a one output, gate 413 will also generate a one output in response to the one at the data input. Gate 414 will produce a zero output and gate 415 a one output, the result being the transmission of a positive pulse to the transmission link.

When the B1 pulse is followed by a B2 pulse, gate 412 remains with a one output and gate 413 then generates a zero output. This combination results in a one output from gate 414 and a zero output at gate 415. These signals coupled from gates 415 and 414 result in the transmission of a negative pulse to the transmission link.

It will thus be obvious that when a mark input signal is present the transmitter of the present invention will generate during the two clock pulses of clock 411 a positive pulse followed immediately thereafter by a negative pulse. During intervals when B1 and B2 signals are both zero the outputs of gates 414 and 415 are both one because of the zero output of gate 412. The application of one (positive) signal to both terminals of the primary winding of transformer winding 416 results in no signal output from the transmitter to the transmission link.

Connected to the transmission link of FIG. 4 is receiver circuitry useful in the present system of data transmission. The circuit as may be observed recovers the data input and both B1 and B2 clock signals. Signals applied over the transmission link and coupled to center tapped transformer 420 appear as signals at points W and Z as follows:

When the transmitter output is 0 (gates 415 and 414 are one) points W and Z are both 0.

When the output of the transmitter is a +1 (gate 415 one, gate 414 0) point W is 1 and point Z is 0.

When the output of the transmitter is −1 (gate 415 zero, gate 414 one) W is 0 and Z is 1.

When a one is present at either point W or Z the signal will be applied to the input of NOR gate 423 which will then remove the one output signal which is utilized as a reset for flip-flop circuits 424 and 425. It should be noted that flip-flop circuits 424 and 425 are of conventional design and of the form referred to as type D flip-flops. Normally when no input signal is present both the flip-flops are in their reset condition because of a normally one output from gate 423.

Assuming now that a space indicative signal represented by a negative pulse immediately followed by a positive pulse is being received at the receiver the one present at point Z will cause flip-flop 425 to operate and generate a one at its upper output. The lower output produces the reciprocal or a zero. A zero signal present at the input of flip-flop 424 will cause the upper output to remain at zero and the lower output to remain at one. The upper outputs of flip-flops 424 and 425 are coupled to an EXCLUSIVE-OR gate 426 while the lower outputs of both flip-flops are connected to the inputs of NOR gate 427. The presence of a one at the upper output of flip-flop 425 in combination with the zero from the upper output of flip-flop 424 will cause EXCLUSIVE-OR gate 426 to generate a one at its output which will generate an output on the clock pulse phase one output. The presence of a one on the lower output of flip-flop 424 will cause a zero output from gate 427 on the clock pulse phase two output. The output of gate 426 is also coupled to flip-flop 428, as is point W. Flip-flop 428 will stay in its zero state, representative of a space signal.

When the second portion of the incoming signal represented by a positive pulse is received gate 423's output will again be a zero preventing the reset of flip-flop 424 or 425. Flip-flop will now generate a one at its upper output and a zero at its lower output while flip-flop 425 will be maintained in its previously established state of a one at its upper output and a zero at its lower. The resultant outputs will cause gate 426 to go to a zero and gate 427 to a one showing the presence of a zero on clock pulse phase one output and a one or true signal on the clock pulse phase two output. Again flip-flop 428 will remain in its previously set state showing a space output.

After the pair of output pulses from the transmitter have been received and detected, gate 423 will again operate to reset flip-flops 424 and 425. Gates 426 and 427 will now both produce zero outputs indicating no clock pulses are present and flip-flop 428 will remain in its previous state.

Assuming now that an output pulse pair from the transmitter is received representing a mark signal, a pulse pair consisting of a positive pulse immediately followed by a negative pulse will be received. The reception of the positive pulse will cause the reset signal to be removed at gate 423 from both flip-flops 424 and 425. A one will be present at the upper output of flip-flop 424 and the reciprocal zero at the lower output. Flip-flop 425 will remain a zero at its upper output and a one at its lower output. This combination will result in a one output from EXCLUSIVE-OR gate 426 indicating the presence of a phase one clock pulse while a zero will be present on the phase two clock pulse output. The presence of a phase one clock pulse coupled with a one at point W will cause operation of flip-flop 428 which will then generate a one output indicative of a mark signal. When the second pulse of the pair is received gate 423 will prevent flip-flops 424 and 425 from resetting and the negative characteristic of the incoming pulse will cause flip-flop 425 to generate a one at its upper output and a zero at its lower output. Flip-flop 424 will remain as set previously. The result at this time is that a zero will appear on the clock pulse phase one output while a one will appear on the clock pulse phase two output. Flip-flop 428 will remain set indicating the presence of a mark signal. After the incoming pulse pair is gone flip-flop 428 will remain set until such time as a clock pulse coinciding with the transmission of a space signal is received.

It should be noted that output signals from the receiver portion of the present invention will follow the data input signal supplied to the transmitter by the duration of one phase one clock pulse. The received signals may be utilized in any well known manner. The clock pulses generated at the clock pulse outputs of the receiver circuitry of the present invention may be used to synchronize retransmitted data to distant points.

While but a single embodiment has been shown of the present invention it will be obvious to those skilled in the art that numerous modifications of the present invention may be made without departing from the spirit and scope thereof.

What is claimed is:

1. A data communication method including the transmitting of data signals of first and second values and simultaneously transmitting synchronizing pulses of at least two different phases, and the receiving of said transmission, comprising the steps of:

combining a pair of synchronizing pulses of first and second phases with each data signal of said first value;

generating a pair of consecutive output pulses, the first pulse of a first polarity and the second pulse of a second polarity, in response to each combination of a pair of synchronizing signals with a data signal of said first value, each of said generated pairs of output pulses representative of a data signal of said first value, said first pulse representative of a synchronizing pulse of said first phase, and said second pulse representative of a synchronizing pulse of said second phase;

combining a pair of synchronizing pulses of first and second phases with each data signal of said second value;

generating a pair of consecutive output pulses the first of said second polarity and the second of said first polarity in response to each combination of a pair of synchronizing pulses with a data signal of said second value, each of said generated pairs of output pulses representative of a data signal of said second value, said first pulse representative of a synchronizing pulse of said first phase, and said second pulse representative of a synchronizing pulse of said second phase;

coupling said generated output pulses to a transmission medium;

receiving said output pulses from said transmission medium.

2. The data communication method claimed in claim 1 wherein said receiving step further comprises the steps of:

coupling said output pulse pairs from said transmission medium;

generating in response to each received pulse pair wherein the first pulse is of said first polarity and the second pulse is of said second polarity, a data signal of said first value;

generating in response to each received pulse pair wherein the first pulse is of said second polarity and the second pulses of said first polarity, a data signal of said second value.

3. A data communication method as claimed in claim 2 wherein there are included the additional steps of:

generating in response to each received first pulse of each pair of said pulses, a synchronizing pulse of said first phase;

and generating in response to each received second pulse of each pair of said pulses, a synchronizing pulse of said second phase.

4. A data communication system for transmitting of data signals of first and second values and synchronizing pulses of at least two different phases from a transmitter to a receiver over an intervening transmission medium, said transmitter comprising: means for generating cyclically recurring synchronizing pulses of at least two different phases; gating means connected to said generating means, and to a source of data signals of first and second values, and including a plurality of output circuit connections to said transission medium; said gating means operated in response to a data signal of a first value and a pair of synchronizing pulses of first and second phases, to generate at said output circuit connections a pair of output pulses, said first pulse of said pair, of a first polarity and said second pulse of said pair, of a second polarity; said gating means further operated in response to a data signal of a second value and a pair of synchronizing pulses of first and second phases, to generate at said output circuit connections a pair of output pulses, said first pulse of said pair, of said second polarity and said second pulse of said pair, of said first polarity; said output pulses conducted to said receiver over said intervening transmission medium.

5. A data communication system as claimed in claim 4 wherein: there is further included coupling means comprising a transformer connected between said gating means output circuit connections and said transmission medium.

6. A data communication system as claimed in claim 5 wherein: said gating means comprise an OR gate having input circuit connections to said synchronizing pulse generating means, and an output circuit connection; an EXCLUSIVE-OR gate having a first input circuit connection to the second phase synchronizing pulse output of said generating means and a second input circuit connection to said source of data signals, and an output circuit connection; a first NAND gate including a first input circuit connection to the output of said OR gate and a second input circuit connection to the output of said EXCLUSIVE-OR gate, and an output circuit connection; a second NAND gate including a first input circuit connection to the output of said OR gate and a second input circuit connection to the output of said first NAND gate, and an output circuit connection; said output circuit connections from said first and second NAND gates connected to said coupling means.

7. A data communication system as claimed in claim 4 wherein said receiver comprises: gating means connected to said transmission medium, including a first output circuit connection; said gating means operated in response to receipt of a pair of output pulses from said transmitter conducted over said intervening transmission medium to generate at said first output circuit connection a data signal of said first value, in response to said pair of output pulses including a first pulse of said first polarity followed by a second pulse of said second polarity; and said gating means further operated to generate at said first output circuit connection a data signal of said second value in response to said pair of received output pulses including a first pulse of said second polarity followed by a second pulse of said first polarity.

8. A data communication system as claimed in claim 7 wherein said gating means further include second and third output circuit connections; said gating means further operated in response to the first pulse of each pair of received output pulses to generate a synchronizing pulse of said first phase at said second output circuit connection; and in response to each second pulse of each pair of received output pulses to generate a synchronizing pulse of said second phase at said third output circuit connection.

9. A data communication system as claimed in claim 7 wherein: there is further included coupling means comprising a transformer connected between said transmission medium and said gating means.

10. A data communication system as claimed in claim 8 wherein said gating means comprise the first NOR gate including a plurality of input circuit connections connected to said transmission medium and an output circuit connection; a pair of bistable switching circuits each including a first input circuit connection connected to said transmission medium and a second input circuit connection connected to the output of said first NOR gate, and each including first and second output circuit connections; an EXCLUSIVE-OR gate including a first circuit input connection connected to one of said first bistable switching circuit outputs and a second input circuit connection connected to one of said second bistable switching circuit outputs, the output of said EXCLUSIVE-OR gate connected to said second output circuit; a second NOR gate including a first circuit input connection connected to one of said first bistable switching circuit output circuits and a second input circuit connection connected to a second output of said second bistable switching circuit, and the output of said second NOR gate connected to said third output circuit; and a third bistable switching circuit including a first input connected to said transmission medium, a second input connected to the output of said EXCLUSIVE-OR gate and an output connected to said first output circuit.

* * * * *